United States Patent Office 3,054,793
Patented Sept. 18, 1962

3,054,793
NEW WATER SOLUBLE NITRO DYESTUFFS CONTAINING A MONO- OR DI-HALOGENO-1:3:5-TRIAZINYL-(2)-AMINO GROUP
Harold Thompson Howard, Frank Hayhurst Slinger, and James Wardleworth, all of Manchester, England, assignors to Imperial Chemical Industries Limited, London, England, a corporation of Great Britain
No Drawing. Filed Nov. 4, 1959, Ser. No. 850,784
Claims priority, application Great Britain June 15, 1956
1 Claim. (Cl. 260—247.1)

This application is a continuation-in-part of our application Serial No. 799,428 filed March 16, 1959, now abandoned, which was a division application of our application Serial No. 662,023 filed in the United States on May 28, 1957, now abandoned, and in Great Britain on June 15, 1956.

This invention relates to new water-soluble nitro dyestuffs and more particularly it relates to new nitro dyestuffs containing a 1:3:5-triazinyl-(2)-amino group.

According to the invention there are provided the water-soluble nitro dyestuffs of the formula:

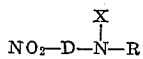

wherein D stands for a naphthalene or benzene nucleus which may be further substituted, wherein the nitrogen atom N is in the ortho position to the nitro group, X stands for hydrogen or for a hydrocarbon radical which may be substituted, R stands for hydrogen or for an organic radical attached to the nitrogen through a carbon atom, and wherein R may be connected to X when X is a hydrocarbon radical or to D, in the ortho position to the nitrogen atom N, to form a heterocyclic ring, which new nitro dyestuffs contain at least one sulfonic acid group and are further characterised in that they contain at least once the group:

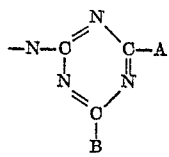

wherein A stands for halogen, B stands for aryl, alkyl, halogen, alkoxy, aryloxy, alkylthio, arylthio, hydroxy, mercapto, amino or substituted amino and Z stands for hydrogen or for a hydrocarbon radical which may be substituted.

As examples of substituents which inter alia may be present in the phenyl or naphthyl nucleus D there may be mentioned the substituents of the formula aryl—Y— wherein the aryl group may contain substituents and where —Y— stands for a direct link or a divalent linking group for example —NR'—, —SO$_2$—, —S—, —O—, —SO$_2$NR'—, —NR'SO$_2$—, —CONR'—, —NR'—CO—, —CO—, —CH$_2$— or —CH=CH—, wherein R' stands for hydrogen or a hydrocarbon radical which may be substituted.

The organic radicals represented in the above formula by R comprise alkyl, aralkyl, cycloalkyl, aryl and heterocyclic radicals which may be substituted by the substituents hereinafter defined.

The hydrocarbon radicals represented by R', X and Z in the above formulae comprise alkyl, aralkyl, cycloalkyl, and aryl radicals which may be substituted by the substituents hereinafter defined.

In addition to at least one sulfonic acid group there may also be present in the phenyl or naphthyl nucleus D, in any aryl nucleus of the group represented by aryl—Y—, or in any aryl nucleus present in an organic radical or hydrocarbon radical represented by X, Z, R or R' substituents such as alkyl, for example methyl and ethyl, —SO$_3$H, —COOH, —CON(R")$_2$, —CN, —COOR", —SO$_2$N(R")$_2$, —COR", —CF$_3$, halogen, for example chlorine and bromine, —SO$_2$OR", —NO$_2$, —SO$_2$R", —OR", —OH, —N(R")$_2$, —NR"COR", and —NR"SO$_2$R" where R" stands for alkyl, cycloalkyl, aralkyl, or aryl, it being understood that more than one such substituent may be present; and that where R" occurs more than once in any substituent the groups represented by R" may, within this definition, be the same or different, or may be alkyl or substituted alkyl groups joined together in such a manner as to form, with the nitrogen atom, a heterocyclic ring.

As examples of substituents which may be present in alkyl radicals present in an organic radical or hydrocarbon radical represented by X, Z, R or R' there may be mentioned hydroxy, cyano and halogen, for example fluorine and chlorine.

In the new nitro dyestuffs of the invention where R is connected to X or to D in the ortho position to the nitrogen atom N to form a heterocyclic ring, the radical R may be such that the heterocyclic ring so formed may contain more than one hetero atom for example it may contain one or more nitrogen, sulphur and/or oxygen atoms in addition to the nitrogen atom N. As examples of heterocyclic ring systems which may thus be formed by attachment of R to X, we mention morpholine and piperazine, and as examples of heterocyclic ring systems which may be formed by attachment of R to D we mention phenoxazine, phenothiazine and acridone.

Thus as examples of alkyl and substituted alkyl radicals which may be represented by X, Z, R and R' there may be mentioned methyl, ethyl, β-hydroxyethyl, β-chloroethyl and β-cyanoethyl; as examples of aralkyl and substituted aralkyl represented by X, Z, R and R' there may be mentioned benzyl and p-chlorobenzyl; as examples of cycloalkyl and substituted cycloalkyl which may be represented by X, Z, R and R' there may be mentioned cyclohexyl and 2-methylcyclohexyl; as examples of aryl and substituted aryl which may be represented by X, Z, R, R' or which may be present in the group represented by aryl—Y— there may be mentioned phenyl, p-aminophenyl, m-aminophenyl, 4-amino-3-sulfophenyl, 3-amino-4-sulfophenyl and 4-methylamino-3-sulfophenyl, and as examples of heterocyclic radicals which may be represented by R there may be mentioned 2:4-dichloro-1:3:5-triazinyl, 2-benzthiazolyl and 2-benzoxazolyl.

As examples of halogen which may be represented by A and B in the above formula there may be mentioned chlorine and bromine. As examples of other groups which may be represented by B there may be mentioned as examples of alkoxy, methoxy and ethoxy; as examples of aryl, phenyl and p-methylphenyl; as examples of alkylthio, methylthio and butylthio; as an example of substituted amino, beta-hydroxyethylamino; as an example of arylthio, p-toylthio; and as examples of aryloxy, phenoxy and p-chlorophenoxy.

While all of the above dyestuffs are within the spirit and scope of this invention, a very valuable class of dyestuffs are those which have the formula:

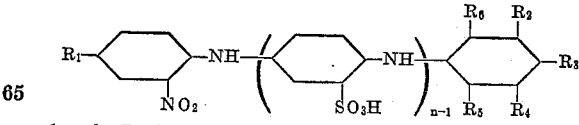

wherein R$_1$ is a radical selected from the group consisting of sulfonic acid,
carboxylic acid,
nitro,
trifluoromethyl, lower alkane sulfonyl,
chloro-substituted lower alkane sulfonyl,
cyano-substituted lower alkane sulfonyl,
monocyclic aryl sulfonyl,
sulfonmorpholido,
N-(monocyclic aryl) sulfamyl,
N,N-di-lower alkyl sulfamyl,
N-(hydroxy lower alkyl)sulfamyl,
N,N-di(hydroxy lower alkyl)sulfamyl,
N-lower alkyl-N-(hydroxy lower alkyl)sulfamyl,
N-benzylsulfamyl,
lower alkyl,
lower alkoxy,
chloro,
cyano,
lower alkanoyl,
carbon morpholido,
N-(monocyclic aryl)carbamyl,
N,N-di lower alkyl carbamyl,
N-(hydroxy lower alkyl)carbamyl,
N,N-di(hydroxy lower alkyl)carbamyl,
N-lower alkyl-N-(hydroxy lower alkyl)carbamyl,
N-benzyl carbamyl and
hydrogen;

$n$ stands for an integer having a value from 1 to 2;
$R_5$ and $R_6$ are radicals independently chosen from hydrogen, methyl and sulfonic acid;
One of the symbols $R_2$, $R_3$ and $R_5$ stands for the radical,

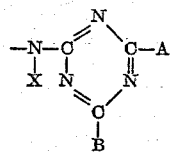

and the other two of the symbols $R_2$, $R_3$ and $R_4$ are independently selected from the class consisting of hydrogen, methyl, chlorine, sulfonic acid, carboxylic acid and N-(hydroxy lower alkyl sulfamyl);

X is selected from the group consisting of hydrogen and lower alkyl;
A is selected from the group consisting of chlorine and bromine;
B is selected from the group consisting of
chlorine,
bromine,
lower alkoxy,
lower alkoxy-lower alkylene-oxy,
monocyclic aryloxy,
monocyclic aryl,
N-lower alkylamino,
N-(hydroxy lower alkyl)amino,
N-(hydroxy-lower alkoxy-lower alkyl)amino,
N-morpholino,
N-lower alkyl-N-(hydroxy lower alkyl)amino,
N,N-di lower alkyl amino,
N,N-di(hydroxy lower alkyl)amino,
N-cyclohexylamino,
N-benzylamino,
N-sulfo lower alkylamino,
N-sulfato lower alkylamino and
monocylic aryl thio, and which contain from 1 to 3 sulfonic acid groups.

In the above statement by lower alkyl is meant alkyl groups having from 1 to about 6 carbon atoms. For instance, examples of groups falling within the scope of the phrase "N,N-di-lower alkyl sulfamyl" are the radicals N,N-dimethyl sulfamyl, N,N-diethyl sulfamyl, N,N-dibutyl sulfamyl, etc. In addition, N-hydroxy lower alkyl sulfamyl contemplates radicals such as N-hydroxyethyl sulfamyl, N-hydroxybutyl sulfamyl, N-hydroxyhexyl sulfamyl; the phrase N,N-di(hydroxy lower alkyl) sulfamyl contemplates N,N-di-(hydroxyethyl) sulfamyl, N,N-di-(hydroxybutyl) sulfamyl, N,N-di(hydroxyhexyl) sulfamyl; and N-lower alkyl-N-hydroxy lower alkyl sulfamyl contemplates radicals such as N-methyl-N-hydroxyethyl sulfamyl, N-hexyl-N-hydroxybutyl sulfamyl, N-ethyl-N-hydroxyhexyl sulfamyl, etc.; the phrase lower alkoxy in the above statement similarly embraces radicals such as methoxy, ethoxy, butoxy and pentoxy; and the phrase lower alkoxy lower alkylenoxy embraces such radicals as ethoxyethoxy, propoxyethoxy, and butoxypropoxy. In addition, it is to be understood that the phrase monocyclic aryl is directed to benzene radicals including those wherein a hydrogen of the benzene ring is replaced by groups such as methyl, chlorine, sulfonic acid, carboxylic acid and acetamido. Generally speaking, dyestuffs having the formula indicated above, but variously containing these individual radicals will show a community of dyeing properties in their common possession of a similar chromophoric grouping and of the halogeno-triazine radical, and in their water-solubility which makes them particularly suitable for the dyeing or printing of textile materials as described hereinafter.

The new nitro dyestuffs may be obtained by interacting a halogeno-1:3:5-triazine of the formula:

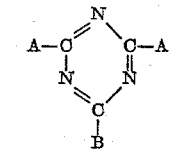

wherein A and B have the meanings stated above, with a nitro compound of the formula

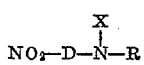

wherein D, N, X and R have the meanings stated above, which contains at least one amino group of the formula —NH.Z wherein Z has the meaning stated above.

As examples of nitro compounds which may be used in the above process there may be mentioned sulfonic acid derivatives of o-nitro-substituted diphenylamines and phenylnaphthylamines, for example 2:4-dinitro-4'-aminodiphenylamine-3'-sulfonic acid,
2-nitro-3'-amino-4'-carboxydiphenylamine-4-sulfonic acid,
2-nitro-4'-(p-aminoanilino-)diphenylamine-3':4-disulfonic acid,
2-nitro-4'-methylaminodiphenylamine-3':4-disulfonic acid,
2-nitro-4'-methylamino-4-sulfon-β-hydroxyethyl-amidodiphenylamine-3'sulfonic acid,
2-nitro-4'-methylamino-4-carboxy-diphenylamine-3'- sulfonic acid,
2-nitro-4'-amino-1'-naphthylphenylamine-4:6'-disulfonic acid and
1:5-dinitro-2:6-di-(4-amino-3-sulfoanilino-)naphthalene.

These sulfonic acid derivatives may conveniently be obtained by the reaction of the appropriately substituted o-nitrochloro-benzene or -naphthalene with the appropriately substituted diamine (at least one of the reagents containing a sulfonic acid group), in aqueous or alcoholic media in the presence of an acid binding agent for example calcium carbonate at elevated temperatures for example at a temperature of 100° C.

As examples of halogeno-1:3:5-triazines which may be used in the process of the invention there may be mentioned cyanuric chloride, 2:4-dichloro-6-methoxy-1:3:5-triazine, 2:4-dichloro-6-phenoxy-1:3:5-triazine, 2:4-dichloro-6-phenyltriazine, 2:4-dichloro-6-(β-hydroxyethylamino-)1:3:5-triazine and 2:4-dichloro-6-methylthio-1:3:5-triazine.

The interaction between the halogeno-1:3:5-triazine and the nitro compound is preferably carried out in a solvent for the nitro compound, preferably water, but an organic solvent, for example acetone or dioxane, which is a solvent for both the nitro compound and for the halogeno-1:3:5-triazine may be used or a mixture of such a solvent with water.

The interaction is preferably carried out at a low temperature which will depend mainly on the medium and the halogeno-1:3:5-triazine used. When cyanuric chloride in aqueous media is used it is preferred to carry out the interaction at a temperature below 15° C., but in anhydrous media higher temperatures may be used. With a dihalogeno-1:3:5-triazine, however, it is preferred to carry out the reaction at a temperature below 85° C. in aqueous media though still higher temperatures may be used in anhydrous media.

If desired, there may be added acid binding agents, for example sodium carbonate, sodium bicarbonate or potassium acetate, to the medium.

The products of reaction of the nitro compounds with cyanuric halides may be further reacted with amines, for example ethanolamine or with the alkali metal salts of phenols for example sodium phenate in water or acetone medium at moderate temperatures, for example at a temperature of 40° C. to give products identical with those obtained by reacting the nitro compounds with the dihalogeno-1:3:5-triazines obtained by reacting cyanuric halides with the corresponding amine or with an alkali metal salt of the corresponding phenol, for example with 2:4-dichloro-6-(β-hydroxyethylamino-)1:3:5-triazine or with 2:4-dichloro-6-phenoxy-1:3:5-triazine.

In order that side reactions, for example hydrolysis, of the halogen atom or atoms remaining attached to the triazine ring are minimised during manufacture and storage, it is generally preferable to isolate the new nitro dyestuffs from the media in which they have been formed at a pH from 6 to 8, and to dry the resultant dyestuff pastes at relatively low temperature, for example between 20° C. and 40° C., preferably in the presence of buffering agents suitable for maintaining a pH value of about 6.5. Examples of such buffering agents are mixtures of disodium hydrogen phosphate and sodium dihydrogen phosphate or of disodium hydrogen phosphate and potassium dihydrogen phosphate.

The dyestuffs of this invention are especially suitable for application to cellulose textile materials, for example cotton, linen and viscose rayon, by dyeing processes which comprise applying the dyestuff in aqueous solution to the textile materials in conjunction with a treatment with an acid binding agent, for example caustic soda or sodium carbonate, the treatment with the acid binding agent being carried out prior to, simultaneously with, or subsequent to the treatment with the dyestuff solution.

They may also be used for the printing of cellulosic textile materials by a process which comprises applying thereto a printing paste containing the dyestuff and a substance which on heating or steaming liberates an acid binding agent, for example sodium bicarbonate, and subsequently subjecting the textile materials to the action of heat or steam. They may also be used for the printing of wool and silk and regenerated protein fibres such as casein and ardein. They may also be used for the dyeing of silk, wool and polyamide textile materials for example textile materials containing polyhexamethylene adipamide or the polymer obtained from caprolactam.

By the above processes there are obtained yellow, orange and red-brown colourations having high light-fastness and fastness to wet treatments.

The invention is illustrated but not limited by the following examples in which parts and percentages are by weight:

*Example 1*

19.45 parts of 2-nitro-4'-amino-diphenylamine-3':4-disulfonic acid are dissolved in 300 parts of water containing 50 parts of 2 N sodium carbonate solution, and the resulting solution is added to a stirred suspension of cyanuric chloride (prepared by dissolving 9.25 parts of the latter in 40 parts of acetone and drowning the solution into 150 parts of ice-water). The mixture is stirred at a temperature between 0° C. and 5° C. and adjusted to pH 7, at short intervals, by the addition of 2 N sodium carbonate solution. The reaction is complete when a clear solution is formed. 100 parts of a solution containing 6 parts of disodium hydrogen phosphate and 12 parts of potassium dihydrogen phosphate in 82 parts of water are added. 100 parts of sodium chloride are added and the mixture is stirred for a short time, filtered and the residue is dried at room temperature. The product contains 41% of inorganic matter and 7.27% of organically combined chlorine (the dichlorotriazinyl derivative of the starting material (at 59% purity) contains 7.21% of chlorine). The orange-red product dyes wool and cotton in orange shades of high fastness to light and wet treatments.

The 2-nitro-4'-aminodiphenylamine-3':4-disulfonic acid used as starting material in the above example may be obtained by interaction of equimolar amounts of p-phenylenediamine-2-sulfonic acid and 4-chloro-3-nitrobenzenesulfonic acid in aqueous solution at the boil in the presence of calcium carbonate. The resulting mixture is made alkaline to litmus with sodium carbonate, filtered and the filtrate is made acid to Congo Red with 35% aqueous hydrochloric acid. The greenish yellow precipitate is filtered off, washed with 2 N hydrochloric acid and dried.

The following table describes the shades of other dyestuffs of the invention which have been obtained by using 0.05 gram mole of the compound named in the first column in place of the 2-nitro-4'-aminodiphenylamine-3':4-disulfonic acid but otherwise following the general procedure of Example 1.

| | | |
|---|---|---|
| (2) | 2-nitro-3'-amino-4'-carboxydiphenylamine-4-sulfonic acid. | Reddish yellow. |
| (3) | 2-nitro-3'-amino-5'-carboxydiphenylamine-4-sulfonic acid. | Do. |
| (4) | 2-nitro-4'-methylaminodiphenylamine-3':4-disulfonic acid. | Yellow. |
| (5) | 2-nitro-4'-methylamino-4-carboxydiphenylamine-3'-sulfonic acid. | Do. |
| (6) | 2-nitro-4-β-hydroxyethylsulfamyl-4'-methylaminodiphenylamine-3'-sulfonic acid. | Do. |
| (7) | 2-nitro-4-β-hydroxyethylsulfamyl-4'-(4''-aminoanilino) diphenylamine-3'-sulfonic acid. | Brown. |
| (8) | 2-nitro-4'-(4''-aminoanilino) diphenylamine-3':4-disulfonic acid. | Do. |
| (9) | 2-nitro-4-di(β-hydroxyethyl) sulfamyl-4'-(4''-aminoanilino)diphenylamine-3'-sulfonic acid. | Do. |
| (10) | 2-nitro-4-(N-methyl-N-β-hydroxyethyl) sulfamyl-4'-(4''-aminoanilino) diphenylamine-3'-sulfonic acid. | Do. |
| (11) | 2-nitro-4-dimethylsulfamyl-4'-(4''-aminoanilino) diphenylamine-3'-sulfonic acid. | Do. |
| (12) | 2-nitro-4-sulfonmorpholido-4'-(4''-aminoanilino)diphenylamine-3'-sulfonic acid. | Do. |
| (13) | 2-nitro-4-(m-sulfophenyl) sulfamyl-4'-(4''-aminoanilino)-diphenylamine-3'-sulfonic acid. | Do. |
| (14) | 2-nitro-4-methanesulfonyl-4'-(4'''-aminoanilino) diphenylamine-3'-sulfonic acid. | Do. |
| (15) | 2-nitro-4-carboxy-4'-(4'''-aminoanilino)diphenylamine-3'-sulfonic acid. | Do. |

*Example 16*

8.2 parts of sodium 2:4-dinitro-4'-aminodiphenylamine-3'-sulfonate (made by reaction of 2:4-dinitrochlorobenzene with p-phenylenediamine-o-sulfonic acid in aqueous ethanol in presence of calcium carbonate) is stirred in 600 parts of ice and water and a solution of 4.5 parts of 2:4-dichloro-6-methoxy-1:3:5-triazine in acetone is added. The mixture is heated to 35° C. and the pH is adjusted to 7 at intervals by addition of 2 N sodium carbonate until the colour of the suspended dyestuff has changed from red-orange to yellow-orange and the pH has remained constant for 15 min. 6 parts of disodium hydrogen phosphate and 12 parts of potassium dihydrogen phosphate are added and the mixture is filtered and the residue is dried at room temperature. The product so obtained contains 35% of inorganic matter and 5.0% of organically combined chlorine (the mono-chloro-monomethoxy-triazinyl derivative of the starting material at 65% purity contains 4.5% of chlorine). The product dyes wool and cotton in orange shades of high fastness to light and wet treatments.

tained by condensing together equimolecular proportions of cyanuric chloride, the compound named in the first column and the amine named in the second column.

| | | | |
|---|---|---|---|
| (36) | 2-nitro-5'-amino-2'-methyldiphenylamine-4:4'-disulphonic acid | Ethylamine | Reddish yellow. |
| (37) | 2-nitro-5'-aminodiphenylamine-2':4:4'-trisulfonic acid | Diethanolamine | Yellow. |
| (38) | 2-nitro-3'-amino-2'-methyldiphenylamine-4:5'-disulfonic acid | β-Aminoethyl hydrogen sulfate | Reddish yellow. |
| (39) | 2-nitro-4'-chloro-3'-aminodiphenylamine-4-sulfonic acid | Diethylamine | Do. |
| (40) | 2-nitro-3'-amino-4-acetyldiphenylamine-4'-sulfonic acid | N-methyl ethanolamine | Do. |
| (41) | 2-nitro-4'-amino-4-acetyldiphenylamine-3'-sulfonic acid | Metanilic acid | Orange. |
| (42) | 2-nitro-3'-amino-4-β-hydroxyethylcarbamyldiphenylamine-4'-sulfonic acid | p-Aminoacetanilide | Reddish Yellow. |
| (43) | 2-nitro-4'-amino-4-di(β-hydroxyethyl)carbamyldiphenylamine-3'-sulfonic acid | Butylamine | Orange. |
| (44) | 2-nitro-4'-amino-4-dimethylcarbamyldiphenylamine-3'-sulfonic acid | N-ethyl ethanolamine | Do. |
| (45) | 2-nitro-4'-amino-4-(N-methyl-N-β-hydroxyethyl)carbamyldiphenylamine-3'-sulfonic acid | Ammonia | Do. |
| (46) | 2-nitro-4'-amino-4-carbonmorpholidodiphenylamine-3'-sulfonic acid | Orthanilic acid | Do. |
| (47) | 2-nitro-3'-amino-4-cyclohexylcarbamyldiphenylamine-3'-sulfonic acid | β-Hydroxyethylamine | Do. |
| (48) | 2-nitro-3'-amino-4-benzylcarbamyldiphenylamine-4'-sulfonic acid | Cyclohexylamine | Reddish yellow. |
| (49) | 2-nitro-4'-amino-4-benzylcarbamyldiphenylamine-3'-sulfonic acid | β-Hydroxyethoxyethylamine | Orange. |
| (50) | 2-nitro-3'-amino-4-ethoxydiphenylamine-4'-sulfonic acid | Benzylamine | Reddish yellow. |
| (51) | 2-nitro-3'-amino-4-phenylcarbamyldiphenylamine-4'-sulfonic acid | Morpholine | Do. |
| (52) | 2-nitro-4'-amino-4-phenylcarbamyldiphenylamine-3'-sulfonic acid | Ethanolamine | Orange. |
| (53) | 2-nitro-3'-amino-4-acetamidodiphenylamine-4'-sulfonic acid | Ammonia | Reddish yellow. |
| (54) | 2-nitro-3'-amino-4-methanesulfonyldiphenylamine-4'-sulfonic acid | Methylamine | Do. |
| (55) | 2-nitro-4'-amino-4-chloromethanesulphonyldiphenylamine-3'-sulfonic acid | Diethanolamine | Orange. |
| (56) | 2-nitro-4'-amino-4-cyanomethanesulfonyldiphenylamine-3'-sulfonic acid | Aniline-2:5-disulfonic acid | Do. |
| (57) | 2-nitro-4'-amino-4-cyanodiphenylamine-3'-sulfonic acid | 4-methoxyaniline-2-sulfonic acid | Do. |
| (58) | 2-nitro-4'-amino-4-methyldiphenylamine-3'-sulfonic acid | Dimethylamine | Do. |
| (59) | 2-nitro-4'-amino-4-chlorodiphenylamine-3'-sulfonic acid | Sulfanilic acid | Do. |
| (60) | 2-nitro-4'-aminodiphenylamine-3'-sulfonic acid | Aniline-2:5-disulfonic acid | Do. |
| (61) | 2-nitro-4'-amino-4-(4''-chlorophenylsulfonyl)diphenylamine-3'-sulfonic acid | Taurine | Do. |
| (62) | 2-nitro-4'-amino-4-methoxydiphenylamine-3'-sulfonic acid | m-Aminobenzoic acid | Do. |
| (63) | 2-nitro-3'-amino-4'-methyldiphenylamine-4-sulfonic acid | Ammonia | Reddish-yellow. |
| (64) | 2-nitro-3'-amino-5'-methyldiphenylamine-4-sulfonic acid | Ethanolamine | Do. |

The following table describes the shades of further examples of dyestuffs of the invention which have been obtained by condensing together equimolecular proportions of the compound named in the first column and the halogeno-s-triazine named in the second column. For brevity, only the substituents on the triazine ring are given, the words "s-triazine" being omitted. The reaction times and temperatures employed during reaction are also indicated.

What we claim is:

Water-soluble nitro dyestuffs which contain from 1 to 3 sulfonic acid groups, and of the formula

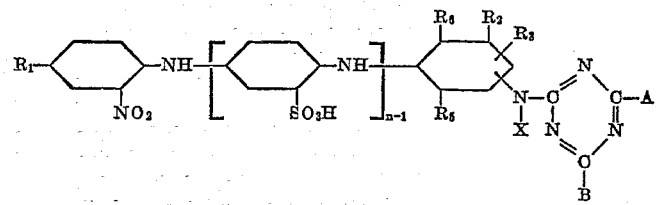

wherein $R_1$ is a radical selected from the group consisting of sulfonic acid, carboxylic acid, nitro, trifluoromethyl, lower alkane sulfonyl, chloro lower alkane sulfonyl, cyano lower alkane sulfonyl, monocyclic aryl sulfonyl, sulfonmorpholido, N-(monocyclic aryl) sulfamyl, N,N-di-lower alkyl sulfamyl, N-(hydroxy lower alkyl)

| | | | | |
|---|---|---|---|---|
| (17) | 2-nitro-4-β-hydroxyethylsulfamyl-4'-methylaminodiphenyl-amine-3'-sulfonic acid | 2:4-dichloro-6-methoxy | 35° C./1 hr | Yellow. |
| (18) | do | 2:4-dichloro-6-phenoxy | 35–40° C./3 hrs | Do. |
| (19) | do | 2:4-dichloro-6-phenyl | 65 to 70° C./1½ hrs | Do. |
| (20) | do | 2:4:6-tribromo | 5 to 10° C./75 mins | Do. |
| (21) | do | 2:4-dichloro-6-thiocresoxy | 80 to 85° C./30 mins | Do. |
| (22) | do | 2:4-dichloro-6-anilino | 85° C./30 mins | Do. |
| (23) | do | 2:4-dichloro-6-p-sulfophenoxy | 35 to 40° C./3 hrs | Do. |
| (24) | 2-nitro-4'-aminodiphenylamine-3':4-disulfonic acid | 2:4-dichloro-6-methoxy | 34–37° C./30 mins | Orange. |
| (25) | do | 2:4-dichloro-6-ethoxy | 35° C./30 mins | Do. |
| (26) | do | 2:4-dichloro-6-butoxy | 40° C./90 mins | Do. |
| (27) | do | 2:4-dichloro-6-β-ethoxyethoxy | 35° C./30 mins | Do. |
| (28) | do | 2:4-dichloro-6-phenoxy | 80° C./2 hrs | Do. |
| (29) | do | 2:4-dichloro-6-thiocresoxy | 80 to 85° C./30 mins | Do. |
| (30) | 2-nitro-4-trifluoromethyl-4'-aminodiphenylamine-3'-sulfonic acid | 2:4-dichloro-6-phenoxy | 80° C./15 mins | Do. |
| (31) | 2 nitro-4'-amino-4-β-hydroxyethylsulfamyldiphenylamine-3'-sulfonic acid | do | 80° C./1½ hrs | Do. |
| (32) | 2-nitro-4'-amino-3'-β-hydroxyethylsulfamyldiphenylamine-4-sulfonic acid | do | 80° C./15 mins | Do. |
| (33) | 2-nitro-4'-amino-4-carboxydiphenylamine-3'-sulfonic acid | do | 80° C./10 mins | Do. |
| (34) | 2-nitro-4'-aminodiphenylamine-4-sulfonic acid | do | 80° C./5 mins | Do. |

*Example 35*

19.45 parts of 2-nitro-4'-aminodiphenylamine-3':4-disulphonic acid are reacted with 9.25 parts of cyanuric chloride as described in Example 1. To the resulting solution, a solution of 6.1 parts of ethanolamine in 50 parts of water is added dropwise, regulating the addition to maintain a pH of 7.2 to 7.4, whilst raising the temperature to 40° C. The solution is then stirred at this temperaturure until the pH remains steady. 150 parts of sodium chloride are added, and the precipitated product is filtered off, and dried at 40° C. The orange coloured product dyes cellulose in orange shades of high fastness to light and wet treatments.

The following table describes the shades of further examples of dyestuffs of the invention which have been obsulfamyl, N,N-di(hydroxy lower alkyl) sulfamyl, N-lower alkyl-N-(hydroxy lower alkyl) sulfamyl, N-benzylsulfamyl, lower alkyl, lower alkoxy, chloro, cyano, lower alkanoyl, carbonmorpholido, N-(monocyclic aryl) carbamyl, N,N-di lower alkyl carbamyl, N-(hydroxy lower alkyl) carbamyl, N,N-di(hydroxy lower alkyl) carbamyl, N-lower alkyl-N-(hydroxy lower alkyl) carbamyl, N-benzyl carbamyl and hydrogen;

$R_5$ and $R_6$ are radicals independently selected from the class consisting of hydrogen, methyl and sulfonic acid;

$R_2$ and $R_3$ are radicals independently selected from the group consisting of hydrogen, methyl, chlorine, sulfonic acid, carboxylic acid and N-(hydroxylower alkyl) sulfamyl:

X is selected from the group consisting of hydrogen and lower alkyl;

A is selected from the group consisting of chlorine and bromine;

B is selected from the group consisting of chlorine, bromine, lower alkoxy, lower alkoxy-lower alkylene-oxy, monocyclic aryloxy, monocyclic aryl, N-lower alkyl-amino, N-(hydroxy lower alkyl)amino, N-(hydroxy- lower alkoxy- lower alkyl)amino, N-morpholino, N-lower alkyl-N-(hydroxy lower alkyl)amino, N,N-di lower alkyl amino, N,N-di(hydroxy lower alkyl)amino, N-cyclohexylamino, N-benzylamino, N-sulfo lower alkylamino, N-sulfato lower alkylamino and monocyclic aryl thio.

References Cited in the file of this patent

UNITED STATES PATENTS

| | | |
|---|---|---|
| 2,167,804 | Grubler et al. | Aug. 1, 1939 |
| 2,879,269 | Merian | Mar. 24, 1959 |

FOREIGN PATENTS

| | | |
|---|---|---|
| 106,402 | Switzerland | Aug. 16, 1924 |
| 106,410 | Switzerland | Aug. 16, 1924 |
| 1,195,350 | France | May 19, 1959 |

OTHER REFERENCES

Bergmann: The Chemistry of Acetylene and Related Compounds, page 80, Interscience Publishers Inc., New York (1948).